United States Patent [19]
Morgan

[11] Patent Number: 6,088,953
[45] Date of Patent: Jul. 18, 2000

[54] COLLAPSIBLE PROTECTIVE PLANT COVER

[76] Inventor: Wayne Morgan, 3510 Main St., Soquel, Calif. 95073

[21] Appl. No.: 09/027,086

[22] Filed: Feb. 20, 1998

[51] Int. Cl.⁷ .............................. A01G 13/00; A47G 7/08
[52] U.S. Cl. ........................ 47/31; 47/26; 47/21; 47/20; 47/23; 135/125; 135/126
[58] Field of Search .................................. 47/26, 20, 21, 47/23, 30, 28.1, 39, 31; 5/207, 98.3; 135/125, 126, 99

[56] References Cited

U.S. PATENT DOCUMENTS

| | | | |
|---|---|---|---|
| 633,528 | 9/1899 | Morris | 47/21 |
| 1,422,619 | 7/1922 | Pomilio | 5/98.3 |
| 1,473,845 | 11/1923 | Gardon | 135/99 |
| 1,803,626 | 5/1931 | Lasley | 135/126 |
| 2,009,867 | 7/1935 | Ball | 47/44 |
| 3,477,453 | 11/1969 | D'Ulisse et al. | 135/99 |
| 3,706,160 | 12/1972 | Deibert | 47/21 |
| 4,787,173 | 11/1988 | Lewis | 47/21 |
| 4,825,578 | 5/1989 | Robinson | 43/27 |
| 4,951,333 | 8/1990 | Kaiser et al. | 5/417 |
| 4,969,555 | 11/1990 | Fitzgerald | 206/423 |
| 5,016,388 | 5/1991 | Burress et al. | 47/23 |
| 5,301,706 | 4/1994 | Jones | 135/104 |
| 5,429,148 | 7/1995 | Hammer | 135/121 |
| 5,430,980 | 7/1995 | Ferrier | 52/63 |
| 5,456,043 | 10/1995 | Dacon, Sr. | 47/21 |
| 5,479,741 | 1/1996 | Underwood | 47/30 |
| 5,592,961 | 1/1997 | Chin | 135/125 |
| 5,687,505 | 11/1997 | Haufler et al. | 47/72 |
| 5,930,948 | 8/1999 | Daniel | 47/26 |

*Primary Examiner*—Peter M. Poon
*Assistant Examiner*—Judith A. Nelson
*Attorney, Agent, or Firm*—John J. Leavitt

[57] ABSTRACT

A collapsible protective plant cover comprises a pair of vertically spaced and coaxial support rings of spring steel. A tubular wall made of highly flexible sheeting is connected between the rings for protection from weather and animals. The tubular wall is sized for surrounding a plant with sufficient spacing therefrom. The top ring is spanned by a flexible top sheet. A small handle is attached across a small central hole on the top sheet. A stake is inserted into the ground near the center of the plant. The handle is supported on a hook positioned above the plant on the stake. The cover is entirely supported by the stake. The cover is easily removed from the plant and collapsed by twisting and coiling the rings on themselves. In a second embodiment, the top sheet is removable, and the tubular wall is supported on the stake by a pair of cords attached to the top ring. In a third embodiment, the rings are interwoven into the top and bottom edges of a relatively visually unobtrusive, flexible mesh tubular wall for protection from animals.

20 Claims, 4 Drawing Sheets

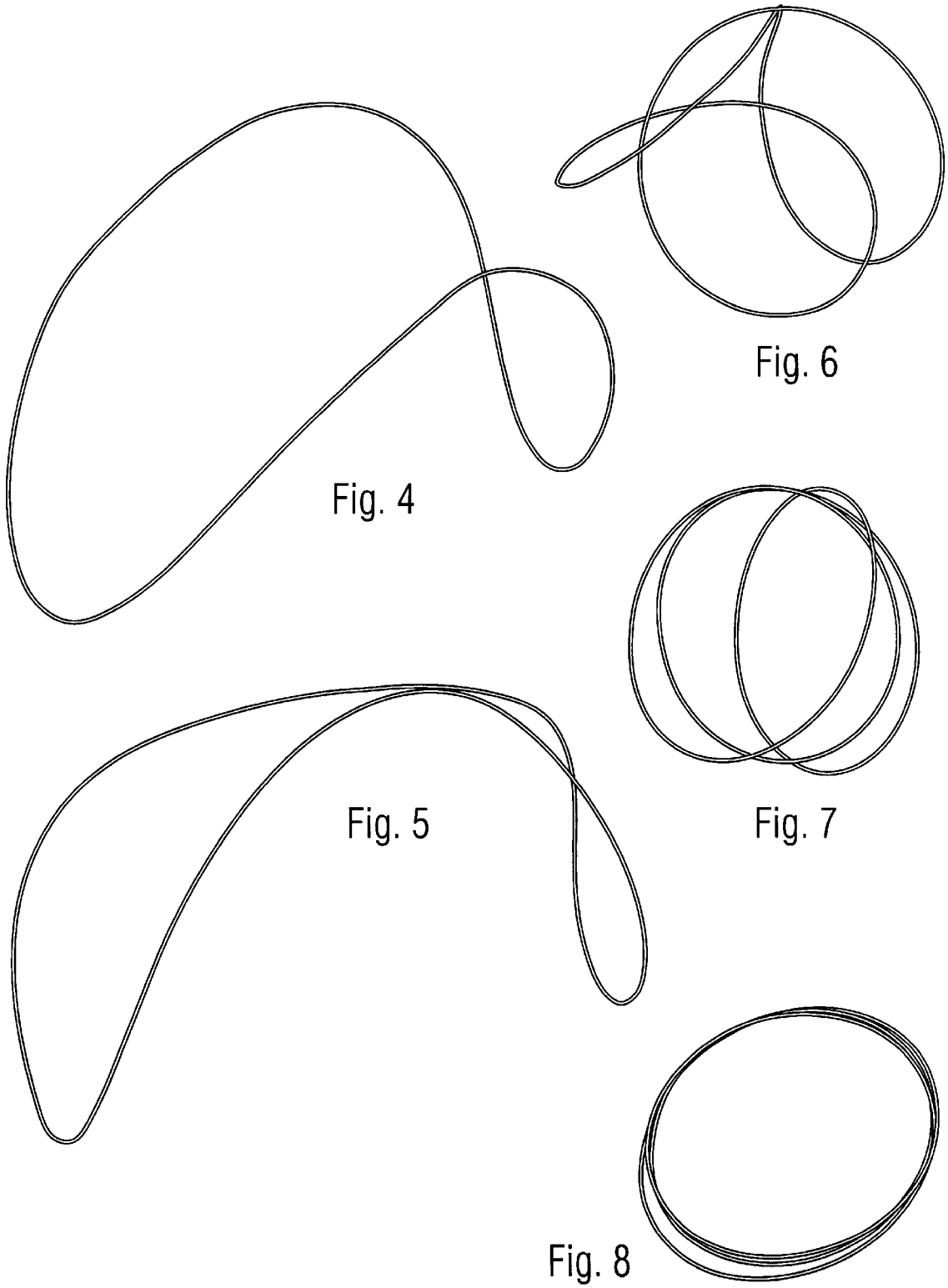

COLLAPSIBLE PROTECTIVE PLANT COVER

BACKGROUND OF THE INVENTION

1. Field of the Invention

This invention relates generally to covers for protecting plants from weather and animals.

2. Prior Art

Some outdoor plants must be protected from weather and animals, such as deer and birds. The prior art includes a variety of covers for providing such protection. U.S. Pat. No. 5,687,505 to Haufler et al. and U.S. Pat. No. 5,479,741 to Underwood each show a semi-rigid sheet rolled into a tube for surrounding a plant. Although the protector can be collapsed by unrolling the tube, the disassembly required makes it inconvenient to do so. Even if they are unrolled, the large sheets are inconvenient to store. Further, the open tubes do not provide weather protection. U.S. Pat. No. 5,456,043 to Dacon, Sr. shows a mesh cover that is merely draped over a plant. It weighs down the plant and may thus damage it. Due to the close contact, the mesh may be caught in the branches, and become difficult to remove and reinstall. U.S. Pat. No. 5,016,388 to Burress et al. and U.S. Pat. No. 4,969,555 to Fitzgerald each show a fabric or mesh sheet for wrapping around a plant. They must be in close contact with the plant for support, so that they may distort and damage it. They have open ends, so that they do not provide any weather protection. U.S. Pat. No. 4,787,173 to Lewis shows a fabric dome with a large ring on the bottom. It may also damage the plant by weighing down on it. It completely covers the plant, which may overheat in hot weather. The large, rigid ring cannot be collapsed, so that it is inconvenient to store. U.S. Pat. No. 3,706,160 to Deibert shows an umbrella plant protector. It is complicated and expensive.

OBJECTS OF THE INVENTION

Accordingly, objects of the present plant cover are:

to protect a plant from weather and animals, such as deer and birds;

to be relatively visually unobtrusive when protecting against animals;

to avoid distorting and stressing the plant;

to be adjustable for covering plants of different heights;

to provide selectable ventilation to prevent overheating in hot weather;

to be easily removed from the plant for picking, pruning, cultivating, etc., to be easily reinstalled over the plant; and to be collapsible into a very compact shape for shipping and storage.

Further objects of the present invention will become apparent from a consideration of the drawings and ensuing description.

BRIEF SUMMARY OF THE INVENTION

A collapsible protective plant cover comprises a pair of vertically spaced and coaxial support rings of spring steel. A tubular wall made of highly flexible sheeting is connected between the rings for protection of a plant from weather and animals. The tubular wall is sized for surrounding a plant with sufficient spacing therefrom. The top ring is spanned by a flexible top sheet. A small handle is attached across a small central hole on the top sheet. A stake is inserted into the ground near the center of the plant. The handle is supported on a hook positioned above the plant on the stake. The cover is entirely supported by the stake. The cover is easily removed from the plant and collapsed by twisting and coiling the rings on themselves. In a second embodiment, the top sheet is removable, and the tubular wall is supported on the stake by a pair of cords attached to the top ring. In a third embodiment, the rings are interwoven into the top and bottom edges of a relatively visually unobtrusive, flexible mesh tubular wall for protection from animals.

BRIEF DESCRIPTION OF THE SEVERAL VIEWS OF THE DRAWING

FIG. 4 is a side perspective view of a support ring of the plant cover being compacted.

FIG. 5 is a side perspective view of the support ring being further compacted.

FIG. 6 is a side perspective view of the support ring being further compacted.

FIG. 7 is a side perspective view of the support ring being further compacted.

FIG. 8 is a side perspective view of the support ring fully compacted.

Figure 1:
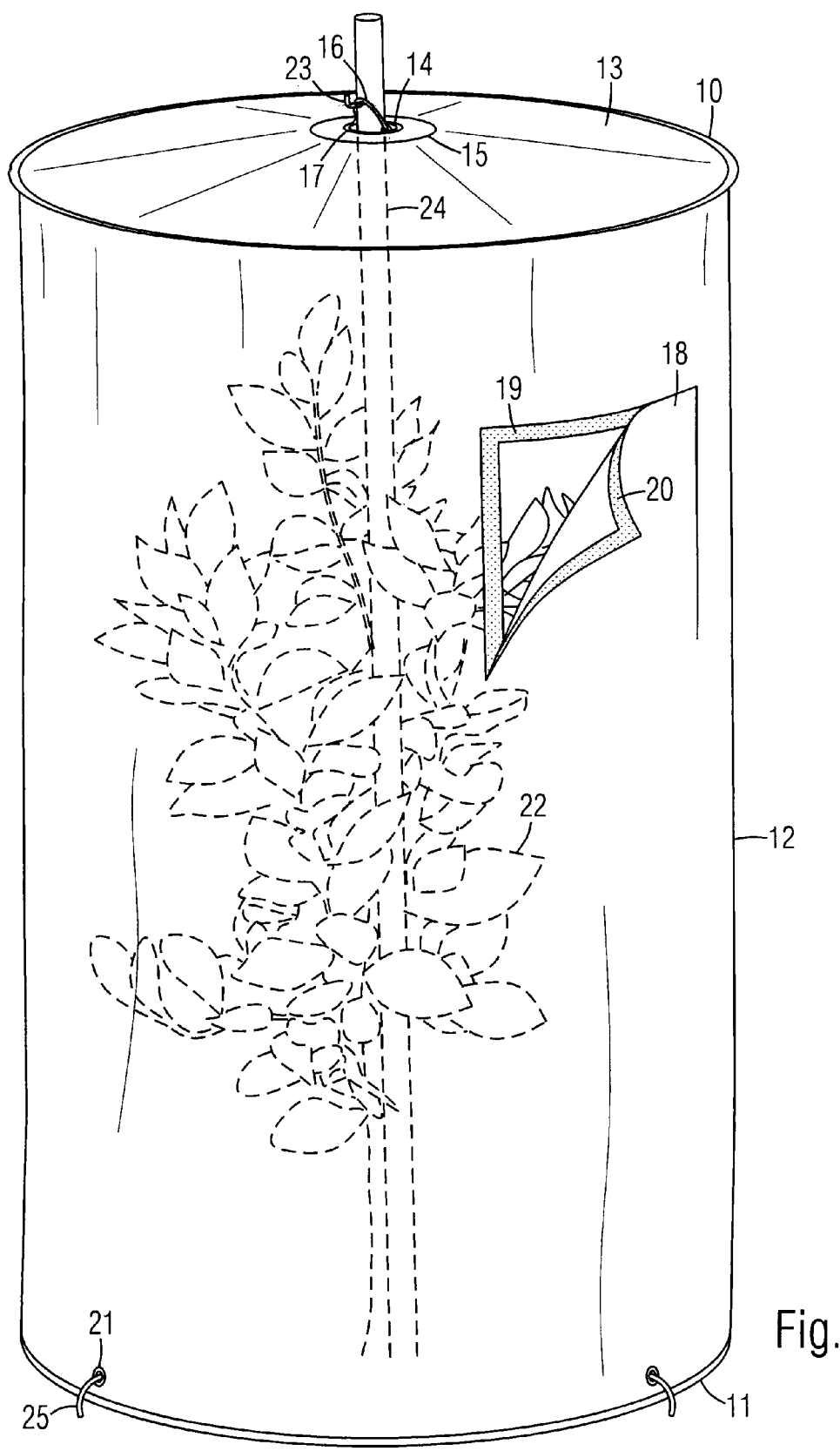
FIG. 1 is a front perspective view of a first embodiment of the present collapsible protective plant cover.

| DRAWING REFERENCE NUMERALS | |
|---|---|
| 10. Top Ring | 11. Bottom Ring |
| 12. Tubular Wall | 13. Top Sheet |
| 14. Central Hole | 15. Reinforcing Disc |
| 16. Supporting Handle | 17. Ring |
| 18. Ventilation Flap | 19. Hook-and-Loop Fastener |
| 20. Hook-and-Loop Fastener | 21. Eyelets |
| 22. Plant | 23. Hook |
| 24. Stake | 25. Staples |
| 26. Top Sheet | 27. Tubular Wall |
| 28. Hook-and-Loop Fastener | 29. Hook-and-Loop Fastener |
| 30. Supporting Cords | 31. Top Ring |
| 32. Top Ring | 33. Bottom Ring |
| 34. Connecting Straps | 35. Tubular Wall |
| 36. Supporting Cords | 37. Hook |
| 38. Stake | 39. Plant |
| 40. Ring | |

DETAILED DESCRIPTION OF THE INVENTION

FIG. 1:

A first embodiment of the present collapsible protective plant cover is shown in the front perspective view in FIG. 1. It comprises a top ring 10 and a bottom ring 11 both preferably made of easily coiled spring steel. Rings 10 and 11 are connected by a coaxial collapsible tubular wall 12 preferably made of a lightweight, very flexible and easily collapsible material, such as fabric or netting. Top ring 10 is spanned by a top sheet 13, preferably made of the same flexible material from which the tubular wall is made as shown in FIG. 1. A central hole 14 on top sheet 13 is surrounded by a reinforcing disc 15 of a tougher material. A small supporting handle 16 has opposite ends hinged to a metal ring 17 attached to the rim of hole 14. A ventilation flap 18 provided on tubular wall 12 is closed by hook-and-loop fasteners 19 and 20. Eyelets 21 are arranged around the bottom edge of tubular wall 12.

The plant cover is sized for positioning around a plant 22 with sufficient spacing therefrom to avoid distorting and stressing the plant. Handle 16 is supported on an elevated support or hook 23 attached to a vertical stake 24, which is inserted into the soil adjacent the center of plant 22. Hook 23 is preferably positioned on stake 24 just high enough to support the plant cover in a fully expanded position, and to position bottom ring 11 in contact with the ground. The bottom end of the plant cover is secured to the ground by conventional gardening staples 25 inserted through eyelets 21. The lower portions of staples 25 are inserted into the ground, so they are not shown.

The plant is thus fully enclosed and protected from weather and animals. The bottom end of the cover can be easily lifted temporarily for providing access to the ground around the base of the plant, such as for fertilization, weeding, etc. Alternatively, hook 23 can be attached higher on stake 24 to support the bottom end of the plant cover spaced above the ground. Hook 23 can be repositioned on stake 24 for covering plants of different heights. Flap 18 can be opened for ventilating the interior of the plant cover in hot weather to prevent overheating the plant. The plant cover can be easily removed by lifting it vertically by freeing the staples 25 and lifting the stake 24 to which the top sheet 14 is suspended by the hook 23. Alternatively, if it is desired to leave the stake embedded in place, the staples 25 are freed, the handle 16 is detached from the hook 23, and the plant cover is lifted off the stake and the plant.. Tubular wall 12 is generally spaced from the plant, so that the plant cover can be removed without snagging on the plant.

Figure 2:
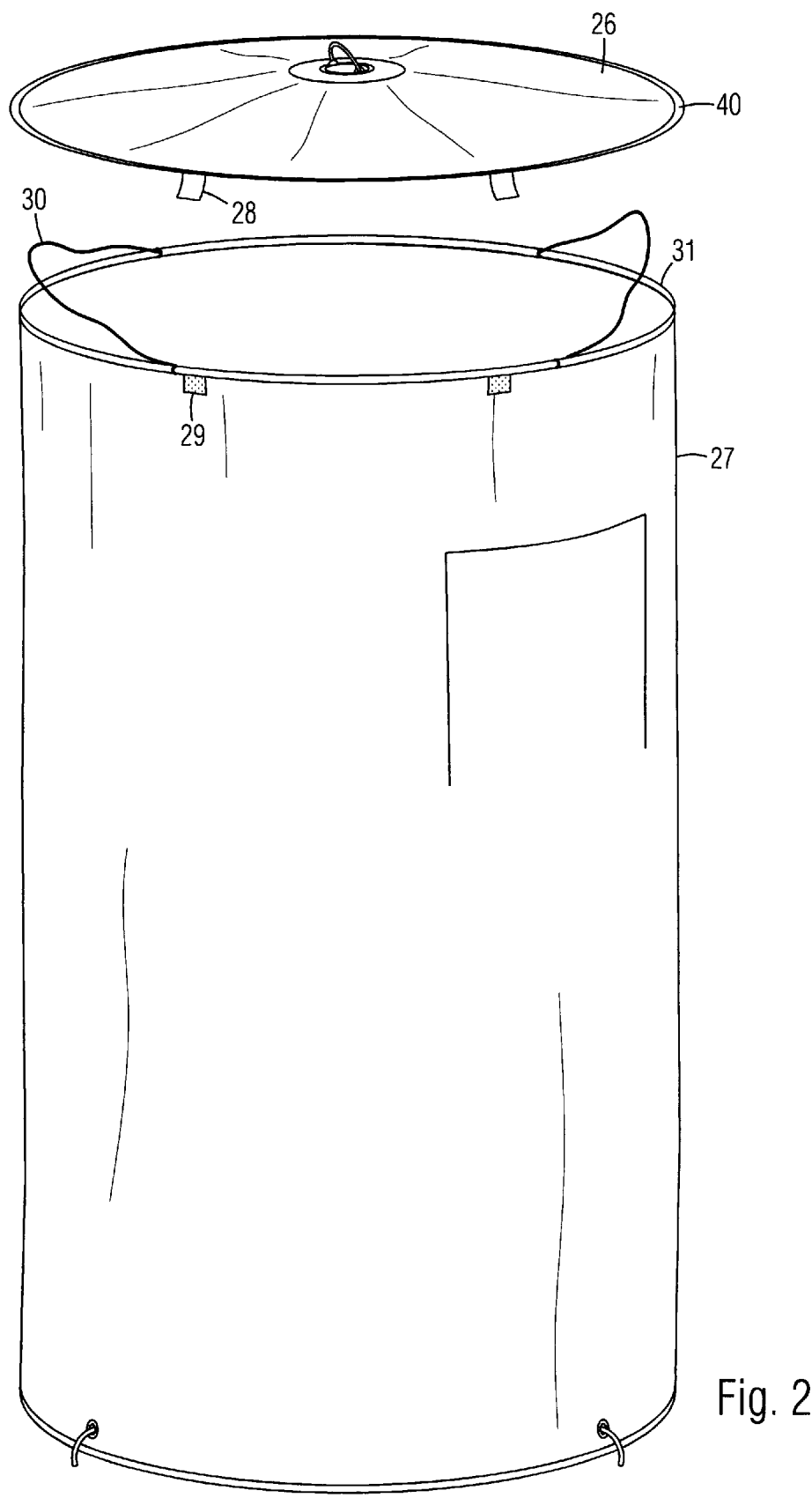
FIG. 2 is a front perspective exploded view of a second embodiment of the plant cover.

FIG. 2:

A second embodiment of the present collapsible protective plant cover is shown in the front perspective exploded view in FIG. 2. It is substantially identical to the first embodiment of FIG. 1, except for a top sheet 26 which is removably attached to a tubular wall 27 by hook-and-loop fasteners 28 and 29 instead of being an extension of the tubular wall as in FIG. 1. A steel ring 40 is arranged around top sheet 26. A pair of supporting means or cords 30 are attached to a top ring 31 for independently supporting the plant cover on a stake 24 and hook 23 (not shown) when top sheet 26 is removed. Supporting cords 30 may be removed from the hook 23 and tubular wall 27 collapsed to the ground for providing access to the plant.

Figure 3:
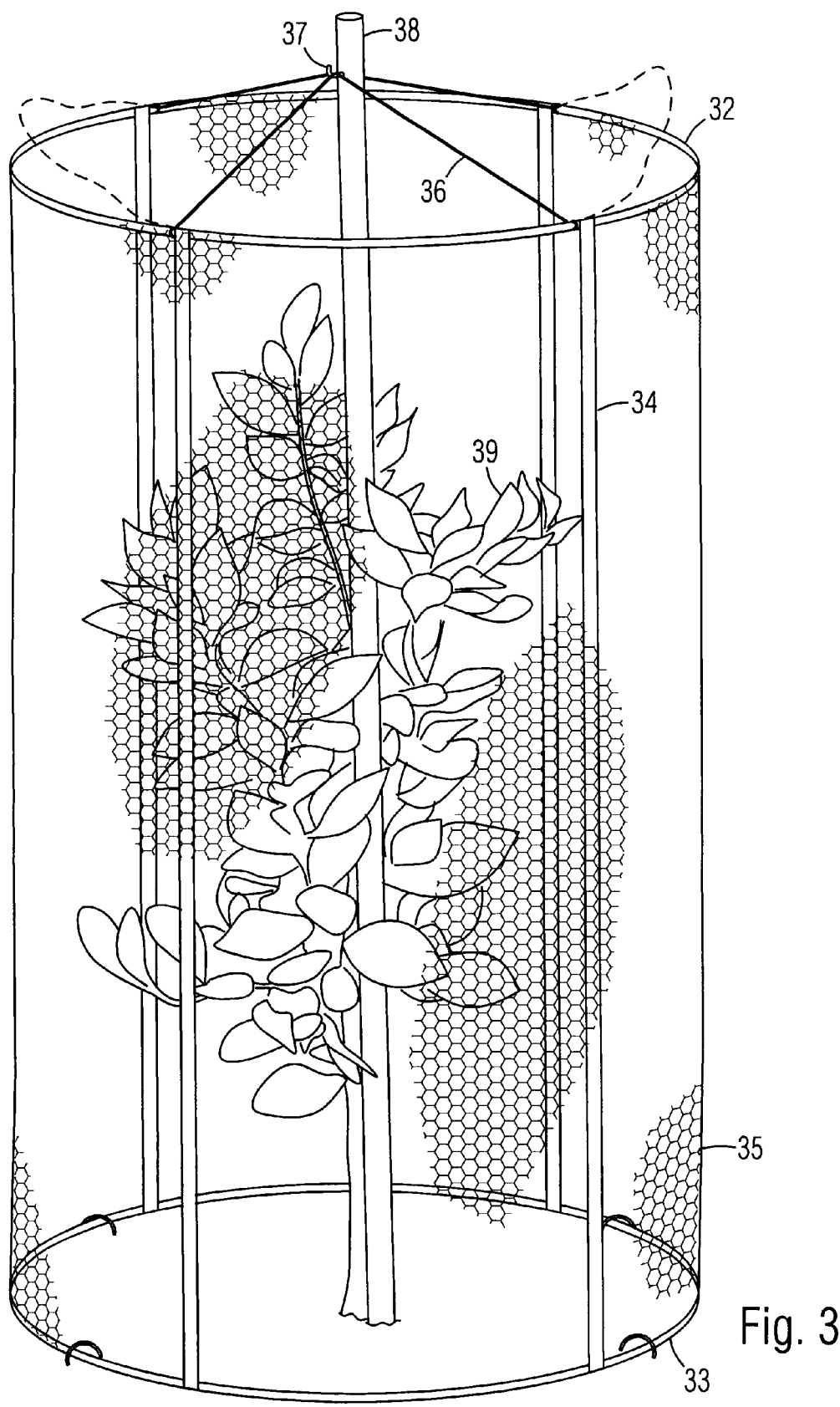
FIG. 3 is a front perspective view of a third embodiment of the plant cover.

FIG. 3:

A third embodiment of the present collapsible protective plant cover is shown in the front perspective view in FIG. 3. It comprises a top ring 32 and a bottom ring 33 interwoven into the top and bottom edges of a tubular wall 35 made of a flexible mesh. A pair of supporting means or cords 36 have ends that are preferably attached to opposite quadrants of top ring 32. Cords 36 are supported on a hook 37 attached to a stake 38 inserted into the ground adjacent a plant 39. The cover is preferably supported so that it is fully expanded and bottom ring 33 is on the ground, but the plant cover may be supported higher so that the bottom ring 33 is elevated above the ground for providing easier access to the bottom of the plant and the soil around it. Plant 39 is thus protected from animals, such as deer and birds, while being relatively visually unobtrusive. If desired, the plant can be fully exposed by unhooking cords 36 from hook 37, moving cords 36 outwardly to the position shown in dashed lines, and collapsing wall 35 around the base of the plant. Moving cords 36 outwardly prevents them from snagging on the plant when wall 35 is collapsed.

Alternatively, top ring 32 and bottom ring 33 may be connected by a plurality of connecting straps 34 arranged around their circumferences. Mesh wall 35 is removably wrapped around straps 34 and rings 32 and 33. The mesh can be removed and replaced with other materials if desired.

FIG. 4:

In all embodiments, the plant cover can be initially compacted by collapsing the tubular wall and superimposing the rings together. The cover is further compacted by twisting the rings into small coils according to the process in FIGS. 4–8 (for clarity, the tubular wall and top sheet are not shown, and only one ring is shown). The plant cover is thus compacted to a very small size for convenient shipping and storage.

SUMMARY AND SCOPE

Accordingly, a collapsible protective plant cover is provided. It protects a plant from weather and animals. It avoids distorting and stressing the plant. It is adjustable for covering plants of different heights. It provides selectable ventilation to prevent overheating the plant in hot weather. It is easily removable from the plant, and it is collapsible to a very compact size for storage.

Although the above description is specific, it should not be considered as a limitation on the scope of the invention, but only as an example of the preferred embodiment. Many substitutes and variations are possible within the teachings of the invention. For example, the cover can be provided in different sizes for covering plants of different sizes. It can be supported by an overhead rope or bar instead of an internal stake, and several covers can be ganged together on the rope or bar. A variety of lightweight, very flexible, and collapsible materials, including fabric, plastic sheeting, and mesh, can be used for the tubular wall. Handle 16 may be a metal arc or flexible cord. Connecting straps 34 can be eliminated, and tubular wall 35 permanently connected between rings 32 and 33. The rings can be polygonal instead of circular. Central hole 14 can be eliminated, so that top sheet 13 serves as a supporting means by being supported on the end of stake 24. The rings can be made of any suitable material. Hooks 23 and 37 can be of any form, such as notches cut into stakes 24 and 38. Therefore, the scope of the invention should be determined by the appended claims and their legal equivalents, not by the examples given.

I claim:

1. A protective plant cover, comprising:

a coilable spring top ring;

a coilable spring bottom ring positioned under said top ring and coaxial therewith;

a flexible collapsible tubular wall connected between said top ring and said bottom ring and coaxial therewith; and a supporting means including a vertically extending support stake having a lower end portion for embedding in the ground within said bottom ring during use and an upper end portion connected to said top ring, said supporting means including said vertically extending support stake supporting said tubular wall in a fully expanded position for surrounding and protecting a plant, wherein said tubular wall has a bottom edge capable of being secured to the ground, said supporting means including said vertically extending support stake and said bottom edge when secured to the ground cooperating to put said tubular wall into tension during use, said plant cover being compacted by collapsing said tubular wall to superimpose said top ring on said bottom ring and twisting said top ring and said bottom ring together into small coils.

2. The protective plant cover of claim 1, wherein said tubular wall comprises a fabric sheet.

3. The protective plant cover of claim 1, wherein said tubular wall comprises a mesh.

4. The protective plant cover of claim 1, wherein said supporting means further includes a centrally apertured top sheet spanning said top ring and connected thereto.

5. The protective plant cover of claim 4, wherein said supporting means further includes a handle attached generally to a center of said top sheet associated with the aperture therein and to the upper end portion of said stake for supporting the center of said top sheet from said vertically extending support stake.

6. The protective plant cover of claim 1, wherein said supporting means further includes a supporting cord attached across said top ring and detachably supported by said vertically extending support stake.

7. The protective plant cover of claim 1, wherein said supporting means further includes a pair of supporting cords attached to opposite quadrants of said top ring, opposite ends of each of said supporting cords attached to said top ring about ninety degrees apart, each of said supporting cords having a center portion attached to said vertically extending stake.

8. The protective plant cover of claim 1, further including a movable ventilation flap arranged on said tubular wall.

9. The protective plant cover of claim 1, further including a plurality of eyelets arranged around a lower edge of said tubular wall for passing gardening staples.

10. The protective plant cover of claim 1, further including a plurality of connecting straps connected between said top ring and said bottom ring, said tubular wall being removably wrapped around said connecting straps, said top ring, and said bottom ring.

11. A protective plant cover, comprising:
a coilable spring top ring;
a flexible collapsible top sheet spanning said top ring;
a central hole arranged on said top sheet for passing a vertical support stake;
a supporting handle connected across said central hole for hanging on a hook on said vertical support stake;
a coilable spring bottom ring positioned under said top ring and coaxial therewith; and
a flexible collapsible tubular wall connected between said top ring and said bottom ring and coaxial therewith, said tubular wall is supported in a fully expanded and tensioned position for enclosing and protecting a plant, said plant cover is compacted by releasing said supporting handle from said hook, collapsing said tubular wall to superimpose said top ring on said bottom ring, and twisting said top ring and said bottom ring together into small coils.

12. The protective plant cover of claim 11, wherein said tubular wall comprises a fabric sheet.

13. The protective plant cover of claim 11, wherein said tubular wall comprises a mesh.

14. A protective plant cover, comprising:
a coilable spring top ring;
a flexible collapsible top sheet spanning said top ring;
a central hole arranged on said top sheet for passing a vertical support stake;
a supporting handle connected across said central hole for hanging on a hook on said vertical support stake;
a coilable spring bottom ring positioned under said top ring and coaxial therewith; and
a flexible collapsible tubular wall connected between said top ring and said bottom ring and coaxial therewith, said tubular wall is supported in a fully expanded position for enclosing and protecting a plant, said plant cover is compacted by releasing said supporting handle from said hook, collapsing said tubular wall to superimpose said top ring on said bottom ring, and twisting said top ring and said bottom ring together into small coils, wherein said top sheet is removably attached to said top ring, said top sheet is fixedly attached within a coilable spring third ring, said plant cover further including a cord attached to said top ring for attaching to said support stake when said top sheet and said third ring are removed.

15. The protective plant cover of claim 11, further including a movable ventilation flap arranged on said tubular wall.

16. The protective plant cover of claim 11, further including a plurality of eyelets arranged around a lower edge of said tubular wall for passing gardening staples, the gardening staples and the support stake cooperating to place the plant cover in tension.

17. A protective plant cover, comprising:
a coilable spring top ring;
a flexible collapsible top sheet spanning said top ring;
a central hole arranged on said top sheet;
a vertical support stake for inserting into sail adjacent a plant, said support stake extending through said central hole on said top sheet;
a hook arranged on said support stake above said plant;
a supporting handle connected across said central hole and engaging said hook on said vertical support stake;
a coilable spring bottom ring positioned under said top ring and coaxial therewith; and
a flexible collapsible tubular wall connected between said top ring and said bottom ring and coaxial therewith, said tubular wall is supported in a fully expanded and tensioned position for enclosing and protecting said plant, said plant cover is compacted by releasing said supporting handle from said hook, collapsing said tubular wall to superimpose said top ring on said bottom ring, and twisting said top ring and said bottom ring together into small coils.

18. A protective plant cover, comprising:
a coilable spring top ring;
a flexible collapsible top sheet spanning said top ring;
a central hole arranged on said top sheet;
a vertical support stake for inserting into sail adjacent a plant, said support stake extending through said central hole on said top sheet;
a hook arranged on said support stake above said plant;
a supporting handle connected across said central hole and engaging said hook on said vertical support stake;
a coilable spring bottom ring positioned under said top ring and coaxial therewith; and a flexible collapsible tubular wall connected between said top ring and said bottom ring and coaxial therewith, said tubular wall is supported in a fully expanded position for enclosing and protecting said plant, said plant cover is compacted by releasing said supporting handle from said hook, collapsing said tubular wall to superimpose said top ring on said bottom ring, and twisting said top ring and said bottom ring together into small coils, wherein said top sheet is removably attached to said top ring, said top sheet is fixedly attached within a coilable spring third ring, said plant cover further including a cord attached to said top ring for attaching to said support stake when said top sheet and said third ring are removed.

19. The protective plant cover of claim 17, further including a movable ventilation flap arranged on said tubular wall.

20. The protective plant cover of claim 17, further including a plurality of eyelets arranged around a lower edge of said tubular wall for passing gardening staples, the gardening staples and the support stake cooperating to place substantially the entire plant cover in tension.

* * * * *